(12) United States Patent
Chan et al.

(10) Patent No.: US 8,429,299 B2
(45) Date of Patent: Apr. 23, 2013

(54) DISTRIBUTED AUDIO AND VIDEO PROCESSING

(75) Inventors: Alex C. Chan, Auburn, MA (US); Gaurav Arora, Northborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 709 days.

(21) Appl. No.: 12/245,216

(22) Filed: Oct. 3, 2008

(65) Prior Publication Data
US 2010/0088733 A1    Apr. 8, 2010

(51) Int. Cl.
*G06F 15/16* (2006.01)
*H04N 7/16* (2006.01)

(52) U.S. Cl.
USPC .......................... 709/246; 725/153

(58) Field of Classification Search .......... 709/246, 709/247, 217, 219, 201, 202, 203; 725/86, 725/87, 101, 105, 114, 115, 116, 117, 118, 725/119, 143, 144, 145, 148, 149
See application file for complete search history.

(56) References Cited

U.S. PATENT DOCUMENTS

| | | | |
|---|---|---|---|
| 4,792,974 A * | 12/1988 | Chace | 381/1 |
| 6,463,445 B1 | 10/2002 | Suzuki et al. | |
| 7,216,177 B1 * | 5/2007 | Strong et al. | 709/230 |
| 7,355,531 B2 | 4/2008 | Lai et al. | |
| 2002/0156870 A1 * | 10/2002 | Boroumand et al. | 709/219 |
| 2006/0182422 A1 | 8/2006 | Peng | |
| 2007/0268164 A1 * | 11/2007 | Lai et al. | 341/51 |
| 2009/0031381 A1 * | 1/2009 | Cohen et al. | 725/115 |

FOREIGN PATENT DOCUMENTS

| | | |
|---|---|---|
| EP | 1328125 A1 | 7/2003 |
| WO | 03073229 A2 | 9/2003 |

OTHER PUBLICATIONS

"802.3" posted Dec. 27, 200 on Whatis.com.*
"Universal Plug and Play," posted Jan. 27, 2006 on Whatis.com.*
International Search Report and Written Opinion from EP Patent Office; International Application No. PCT/US2009/059162; dated Feb. 4, 2010.
Ritchie, John et al.; UPnP AV Architecture:1; Jun. 25, 2002; pp. 1-22; vol. 1.

* cited by examiner

*Primary Examiner* — Scott Christensen
(74) *Attorney, Agent, or Firm* — Faegre Baker Daniels LLP

(57) ABSTRACT

A method of distributing audio and video processing tasks among devices interconnected to a display device via a local network is disclosed. In one embodiment, the display device offloads some processing tasks to a computing device on the local network to achieve improved processing performance. The computing device receives audiovisual data, decodes, processes, encodes and transmits the encoded data to the display device in a suitable data format. The processing in the computing device is complementary to any processing to be performed in the display device. In another embodiment, the display device utilizes a plurality of devices on the local network to perform particular signal processing tasks. The other devices in network perform the processing tasks indicated by the display, and send processed data back to the display device for presentation, which helps improve the overall audiovisual data processing performance.

22 Claims, 7 Drawing Sheets

DISTRIBUTED AUDIO AND VIDEO PROCESSING

FIELD OF THE INVENTION

The present invention relates generally to digital processing of audiovisual signals, and more particularly to distributed processing of audiovisual data using multiple hardware and software platforms.

BACKGROUND OF THE INVENTION

The popularity of digital audio and video materials has led to the availability of a number of consumer electronic platforms that assist in receiving, decoding, processing and displaying digitally encoded audiovisual content on a suitable display.

Consumer electronic platforms include personal computers (PCs), digital versatile disc players (DVD players), high-definition DVD players (HD DVD players), Blu-ray players, digital television (DTV) sets, high definition television (HDTV) sets and set-top boxes. Many types of receivers are used to receive data that may be transmitted via radio frequency (RF) transmission signals, cable television signals, satellite signals or the like.

Audio and video content may also be distributed in the form of a computer readable medium such as DVD, HD DVD, Blu-ray disc (BD), compact disc (CD) or the like. Alternately, encoded audiovisual data may also be received through a telecommunications network such as the Internet, by way of a dial-up link, fiber-optic connection, coaxial cable, digital subscriber line (DSL), or the like.

Digital signal processors (DSPs) have become increasingly popular for manipulating audio and video data. The decreasing cost of embedding DSPs into a variety of electronic devices has enabled the emergence of many devices that are capable of performing many types of data, audio and video processing tasks.

It is now common to see external modems, routers, personal computers, Blu-ray or HD DVD players and display devices, often supplied by different manufacturers, interconnected together in living rooms or home entertainment centers. Decoders such as DVD players, HD DVD players, Blu-ray disc players, set-top boxes may be interconnected directly to display devices. Common display devices include cathode ray tube (CRT) monitors, flat panel displays such as liquid crystal displays (LCDs) or digital light processing (DLP) monitors, plasma displays and other digital television sets. Common audio devices include stand-alone speakers, built-in speakers typically found in various television sets and receivers equipped to receive digital audio from S/PDIF, coaxial or optical connectors. DVD players, HD DVD players, Blu-ray disc players may form part of personal computers (PCs).

Various degrees of audio and video processing capabilities can be found these platforms. For example, a PC often includes a processor, memory, audio adapter card containing an audio DSP and a video graphics card containing a graphics processing unit (GPU). The processor, audio DSP and the GPU may decode compressed audio and video data from a Blu-ray disc loaded into an interconnected Blu-ray drive. The GPU may be able to perform some video processing such as scaling or color space conversion. In addition the GPU may assist decoding by providing a hardware acceleration blocks for demanding video decoding steps. The audio DSP may be able to perform some audio processing such as tone processing, equalization, 3D virtualization or transcoding from one audio format to another.

However, the processor may also perform most or all of the required audio and video decoding tasks in a PC, especially when no hardware acceleration is available. This may be the case, for example, in a low cost personal computer without a dedicated GPU and/or audio DSP.

A PC typically interconnects a CRT monitor by way of a standard video graphics array (VGA) cable. However, the same PC may instead be connected to sophisticated digital displays by way of a digital visual interface (DVI) cable, high definition multimedia interface (HDMI) cable or a DisplayPort compliant cable. As CRT monitors typically have limited processing capabilities, a video source device that uses a CRT monitor for display typically performs essentially all of the video processing. Similarly audio data may be provided to external speakers via L/R output and/or S/PDIF compliant interfaces.

Other types of rendering devices (e.g., a digital television set) however, may have their own video processing capabilities such as scan-rate conversion, interlacing, de-interlacing, noise reduction, scaling, color correction, contrast correction, gamma correction, sharpness enhancement, edge enhancement, and frame rate conversion. In this case, at least some processing can be performed at the display device. Audio processing tasks that may be performed at a source or a sink device include volume adjustment, speaker balancing, 3D virtualization, bass/treble control, automatic volume leveling, and sound equalization.

Unfortunately, when processing capabilities are available in multiple platforms (i.e., on both the source and sink devices), these capabilities may not always be utilized efficiently. For example, a PC connected to a digital television set may perform little or no audio and video processing which requires the digital television to perform nearly all of the audio and video processing requirements. Conversely, the PC may perform nearly all the processing tasks, without utilizing potentially superior image processing algorithms available in the display device. Clearly, such an arrangement does not take full advantage of the available processing capabilities of processors, GPUs, audio DSPs and the like that may be available in both the source (e.g. PC) and sink (e.g. DTV) devices.

Accordingly, there remains a need for methods that allow effective use of the processing capabilities of multiple interconnected platforms, such as PCs and display devices.

SUMMARY OF THE INVENTION

A method for distributing video and audio processing among devices interconnected to a display device via a local network involves determining a network transfer protocol and a data format for exchanging data between the display device and the rest of the devices in the local network. One of the devices in the local network may receive an audiovisual input either from a video server in an external network or from a local source such as a DVD player. The display device may distribute audio and video processing by having at least one device on the local network perform at least one signal processing function and provide the processed data to the display device for presentation using the data format and transfer protocol determined. The processing tasks performed by the various devices on the local network including the display device, are complimentary. The method allows idle processing power within various devices on the local network to be used effectively for video and audio processing.

In accordance with an aspect of the present invention, there is provided a method of processing audiovisual input data received in a computing device, for presentation on a display device interconnected to the computing device via a local network. The method includes receiving instructions from the display device to perform a first signal processing function complementary to a second signal processing function to be performed in the display device, and to use a selected one of network transfer protocols supported in the computing device and a selected one of data formats supported in the computing device. The method also includes performing the first signal processing function on the audiovisual input data to form externally processed data; encoding the externally processed data into the selected data format; and transmitting the externally processed data in the selected data format using the selected network transfer protocol over the local network.

In accordance with another aspect of the present invention, there is provided a method of processing and presenting audiovisual input data received in a computing device using a display device interconnected to the computing device via a local network. The method includes instructing the computing device to: perform a first signal processing function on the audiovisual input data to form externally processed data, the first signal processing function complementary to a second signal processing function to be performed in the display device; encode the externally processed data into the data format; and transmit the externally processed data in the data format to the display using the network transfer protocol over the local network. The method further includes receiving the externally processed data in the data format in the display device; performing the second signal processing function on the received externally processed data; and presenting the received externally processed data on the display device.

In accordance with another aspect of the present invention, there is provided a method of processing audiovisual input data using a display device interconnected to a computing device via a local network. The method includes: receiving audiovisual input data in the display device using a selected transfer protocol and data format. The method further includes instructing the computing device to: receive and perform a first signal processing function on a portion of the audiovisual input to data to form externally processed data, the first signal processing function being complementary to a second signal processing function to be performed in the display device; and to encode and transmit the externally processed data to the display device in the data format to the display device. The method further includes transmitting the portion to the computing device using the transfer protocol and the data format; and accepting and presenting the externally processed audiovisual data from the computing device.

In accordance with another embodiment of the present invention, there is provided a display device including a control circuit in communication with a display screen and a network interface for interconnection to a computing device via a local network. The display device is operable to instruct the computing device to perform a first signal processing function on an audiovisual input data to form externally processed data. The first signal processing function is complementary to a second signal processing function to be performed in the display device. The display device is further operable to instruct the computing device to encode the externally processed data into a selected data format and transmit the externally processed data in the data format to the display device using a selected network transfer protocol over the local network. The display device is further operable to receive the externally processed data transmitted in the data format; perform the second signal processing function on the received externally processed data; and to present the received externally processed data on the display device.

In accordance with another embodiment of the present invention, there is provided a computing device including a processor in communication with memory and a network interface for interconnection to a display device via a local network. The computing device is operable to receive instructions from the display device to perform a first signal processing function complementary to a second signal processing function to be performed in the display device; and to use a network transfer protocol and a data format supported in the computing device. The computing device is further operable to perform the first signal processing function on an audiovisual input data to form externally processed data. The computing device is further operable to encode the externally processed data into the data format. The computing device is further operable to transmit the externally processed data in the data format using the network transfer protocol over the local network.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
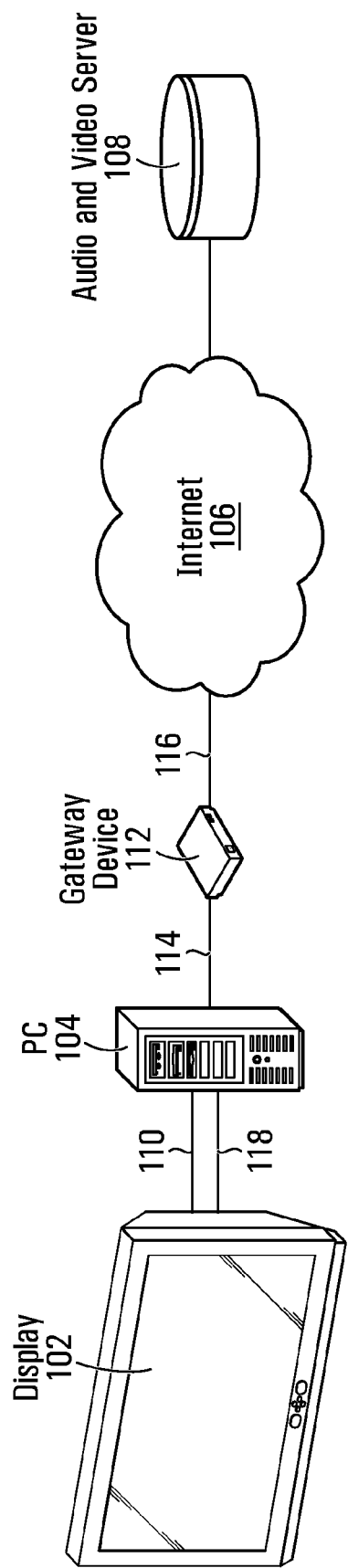
FIG. 1 is a schematic diagram of an exemplary arrangement in which a display device interconnected to a personal computing device in communication with audio and video content provider via a network.

FIG. 1 illustrates a simplified block diagram of a display device 102, interconnected to a personal computing device 104 using a local network 118. Optionally, computing device 104 may also additionally use a suitable audio/video link 110 to interconnect with display device 102. Computing device 104 is in communication with an audio and video server 108 via a gateway device 112 and a data communications network 106 such as the Internet. Network 106 may be an IP (internet protocol) network, or a similar type of wide area network (WAN). Thus, display device 102 may request and receive audio/video content from the network 106 (e.g., the Internet) by way of computing device 104.

Gateway device 112 may be a modem/router device that terminates a data line 116 which may be a coaxial cable, a digital subscriber line (DSL), a fiber-optic link or the like.

Data line 116 thus enables data transfer between device 112 and network 106. Device 112 may optionally be made up of a combination of a separate modem interconnected to a router, with the modem interconnecting or terminating data line 116, and the router interconnecting computing device 104 using a network cable 114. Network cable 114 may be an Ethernet cable. As may be appreciated, in a networked environment such as the arrangement depicted in FIG. 1, digital content (e.g., compressed audio and digital video) can be easily received in a client device (e.g., computing device 104) from digital content servers (e.g., audio and video server 108). Digital content may be received in device 104 by way of downloading, streaming, FTP or the like. More typically, audiovisual signals may be received via a satellite receiver, a digital terrestrial receiver, coaxial cable, and the like. In addition, a local video source such as a Blu-ray, HD DVD or DVD player may originate audiovisual content for presentation on display device 102.

Display device 102 may be a digital display device. For example, display device 102 may be a digital television (DTV) such as high definition television (HDTV) set. Accordingly, link 110 may be a digital visual interface (DVI) cable, a high definition multimedia interface (HDMI) cable or a DisplayPort compliant cable.

Audio and video processing may be distributed across multiple devices on network 118. As noted above, distributed audio/video processing is desirable as different audio/video processing capabilities may exist among different devices on network 118.

In exemplary embodiments of the present invention, processing tasks for audio and video may be distributed among devices (e.g., device 102 and device 104) using network 118 for exchange of control data as well as audio/video data. As will be detailed below, exemplary devices (such as device 102 and device 104) can utilize network 118 to establish, and coordinate data exchange mechanisms for distributing the processing of audio and video data among themselves. Accordingly, audio and video data may be partially processed in display device 102, and partially processed in computing device 104, and ultimately presented on device 102, while utilizing network 118 for coordinated data exchange.

Figure 2:
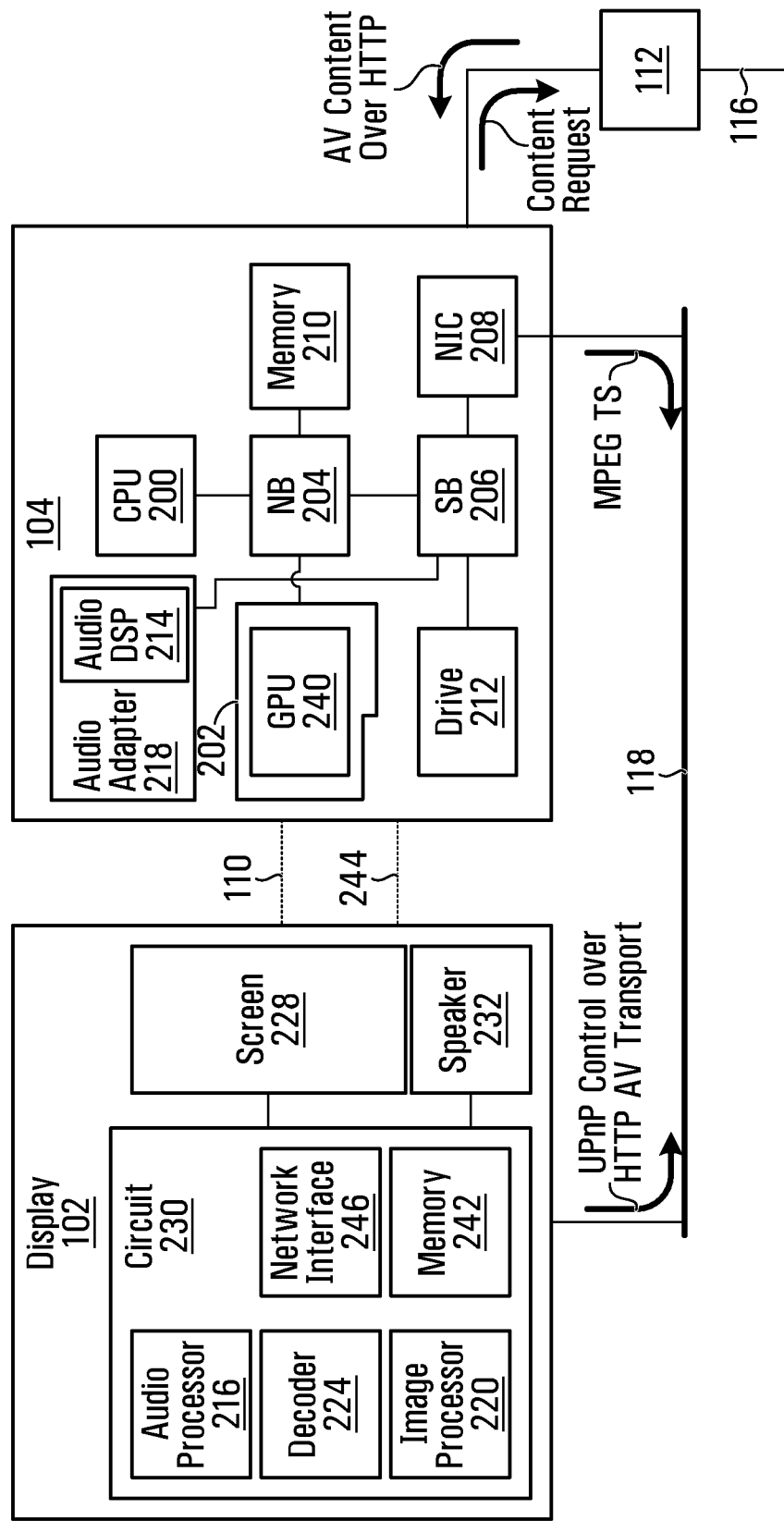
FIG. 2 is a detailed schematic diagram depicting various blocks within the computing and display devices of FIG. 1.

FIG. 2 illustrates a simplified block diagram of computing device 104 and display device 102. Computing device 104 includes a processor 200 which may be a conventional central processing unit (CPU) such as a microprocessor compatible with the AMD® x86 family of microprocessors. However, processor 200 may also have a PowerPC, Intel x86 or other architectures. Processor 200 is interconnected to a block of system memory 210 and peripherals, through integrated interface circuits 204 and 206.

Integrated interface circuits 204 and 206 are often referred to as the North Bridge and South Bridge respectively, and provide an interface for processor 200 to peripherals and memory 210. As shown, interface circuit 204 interconnects processor 200 with a graphics adapter card 202, a block of system memory 210 and interface circuit 206. The South Bridge (interface circuit 206) in turn interconnects a network interface card (NIC) 208, a drive 212, audio adapter 218 (i.e., a sound card) and other lower speed peripherals (not shown).

A graphics processing unit (GPU) 240 forms part of adapter card 202. GPU 240 may for example be one of the ATI Radeon™ family of graphics processors now supplied by Advanced Micro Devices Inc. of Sunnyvale, Calif., U.S.A. The high speed expansion bus may be the Peripheral Component Interconnect Express (PCIe) bus. In other embodiments, GPU 240 may be part of an integrated graphics port formed on the motherboard for computing device 104, in which case graphics adapter card 202 need not be present.

An audio digital signal processor (DSP) 214 may form part of audio adapter 218. Audio adapter 218 may be a PCIe compliant sound card interconnected to a PCIe high speed expansion bus inside device 104. In addition to DSP 214, audio adapter 218 may include a bus interface circuit, filters, digital-to-analog converter (DAC), amplifier and the like.

Display device 102 may include a processing circuit such as control circuit 230, a display screen 228 and a speaker 232. Circuit 230 may be capable of decoding received audio and video data, processing decoded audio and video data, and providing a network interface. Circuit 230 may interconnect to both display screen 228 and speaker 232 to output processed video data and audio data respectively.

Circuit 230 may be formed as an application specific integrated circuit (ASIC). Circuit 230 may for example include one of the Xilleon™ family of digital video processors now supplied by Advanced Micro Devices Inc. of Sunnyvale, Calif., U.S.A. Circuit 230 may include a decoder 224 which may be an MPEG decoder; memory 242; a network interface 246 which may include an Ethernet controller; and an image processor 220 which may in turn include various sub-blocks (not shown) responsible for scan-rate conversion, interlacing, de-interlacing, noise reduction, scaling, color correction, contrast correction, gamma correction, sharpness enhancement, edge enhancement, frame rate conversion and the like.

Circuit 230 may also include an audio processor 216 for processing audio data, and may include blocks responsible for audio decoding, volume, balance, tone control, equalization, sampling rate conversion, delay, synchronization and the like.

As noted above, display device 102 and computing device 104 may be interconnected by local network 118. Local network 118 may be any kind of data communication network with sufficient bandwidth to allow two-way audiovisual data exchange between interconnected devices. Local network 118 may be wired or wireless.

Network 118 may for example be an IP network. Any known physical layer standard such as Ethernet, Bluetooth or Wi-Fi may be used to implement network 118. Alternately a proprietary communication protocol may be used. Numerous alternatives are of course possible. In addition to local network 118 device 102 and device 104 may be also be optionally interconnected by additional links such as link 110 which may be an HDMI cable or link 244 which may for example be a USB link.

Figure 3:
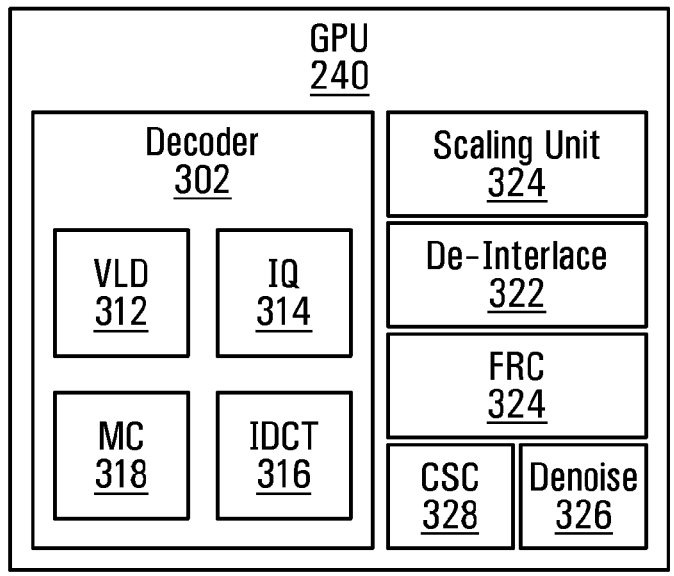
FIG. 3 is a schematic diagram of various blocks within the GPU of the computing device depicted in FIG. 2.
Figure 4:
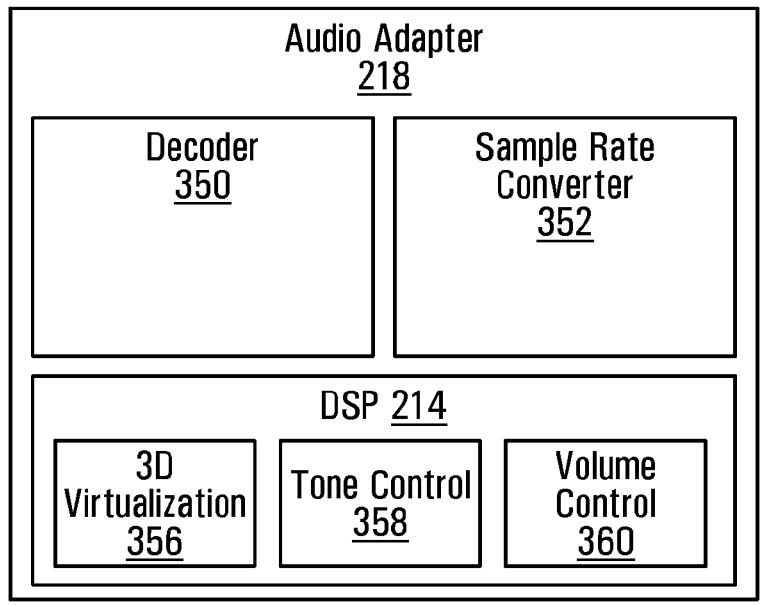
FIG. 4 is a schematic diagram of various blocks within the audio processor of the computing device depicted in FIG. 2.

FIG. 3 depicts a more detailed schematic diagram of individual blocks within device 102, typically implemented within GPU 240. These blocks are used in decoding and processing incoming video. The blocks include a decoder 302, a scaling block 324, a de-interlace block 322, frame rate converter (FRC) 320, a color space conversion (CSC) block 328, and a noise reduction block 326.

Decoder 302 may be an MPEG decoder similar to decoder 224 (FIG. 2) and may in turn include multiple sub-blocks such as a variable length decoder (VLD) 312, an inverse quantization (IQ) block 314, an inverse discrete cosine transformer (IDCT) 316, motion compensation (MC) block 318, local memory 306 and the like.

In operation, encoded audiovisual data may be received in computing device 104, from content server 108 via network 106, through NIC 208. Alternately, a suitable medium such as a Blu-ray disc (BD) or an HD DVD disc, containing audio and video content may be loaded into drive 212. Device 104 may thus read, process and transmit encoded data from a disc, to device 102.

Digital audio and video content servers, such as audio and video server 108, typically target many types of networks (and client devices) including those that involve low rate connections such as dial-up lines. These audio and video servers typically do not negotiate transmission rates with client machines, prior to transmitting audiovisual (AV) content. Thus video data is not always served or provided at the best possible bit rates. Instead, the AV stream is typically provided at low resolutions and/or frame rates that allow the least powerful of the intended target client devices to decode and output the video or audio stream. For example, the resolution of each frame may be limited to 320×240 pixels, or the bit rate may be limited to around 384 kbit/s. As a result audiovisual streams may be received in computing device 104 from server 108 (via network 106) at a very low bit rate.

In addition, typically audiovisual content from the Internet is transmitted in formats that can only be decoded in a few but common platforms such as personal computers utilizing a general purpose CPU loaded with commonly available operating systems. The tools necessary for decoding such video may not readily available on other platforms such as display devices with hard-wired decoders. For example, popular audio and video serving web-sites that provide streaming content over the internet, such as CNN.com or Youtube.com, typically provide their contents in Flash Video (FLV), Quick-Time, or DivX formats which can only be decoded by a proprietary application (e.g., the Adobe Flash® Player software for Flash Video). However, while the Adobe Flash Player is ubiquitous on computing machines running common operating systems such as Windows® and MacOS®, Linux and UNIX@, —its is not readily implemented in current digital television sets and other display devices. Circuits in digital television sets such as circuit 230 are typically adapted to receive audio and video data in standardized stream formats such as Dolby Digital AC3 audio, or MPEG transport stream (MEPG TS) packets encapsulating MPEG encoded audio and video data.

Such format incompatibility between the audio or video stream received in device 104 and the expected input format of display device 102 may be solved by transcoding. Accordingly, computing device 104 may act as a proxy to receive a stream in one format (e.g. Macromedia FLV) and transcode it into another format (e.g., MPEG Transport Stream). This allows display device 102 (which may be digital television set) to receive, process and display on its screen 228, the MPEG TS output by computing device 104. In effect, device 104 first decodes the received stream, and encodes the decoded video and audio data in a format expected by device 102.

To achieve very low bit rates, raw audio and video data is often highly compressed and encoded at server 108, prior to transmission. Unfortunately, such highly compressed data streams lead to very noticeable visual and audio artifacts when decoded and displayed. These artifacts include blocky frames (in which boundaries of macro-blocks are evident), mosquito noise, low frame rates, mono-audio and the like.

Visual distortions may appear to be even more severe when video intended for picture-in-picture (PiP) or picture-in-graphics (PIG) presentation is scaled for full screen display. In addition to decoding the MPEG TS received from device 104, display device 102 may be required to fully utilize its video processing capabilities to scale, filter, reduce noise, edge-enhance, and otherwise improve the displayed image— when such streams are viewed full screen. Similarly audio processing functions such as synchronization, equalization and the like may be performed in device 102.

Unfortunately, the display/audio processing capacity of any one device such as device 102 is limited by its finite amount of memory (e.g., memory 242) as well as the maximum operating speed of its processing circuit (e.g., circuit 230). As such, even when fully utilized, circuit 230 may not be powerful enough to adequately process the received audiovisual stream for playback in a timely manner.

Accordingly, in an exemplary embodiment of the present invention, computing device 104 may be used to assist display device 102 in performing at least part of the necessary audio and/or video processing tasks. In other words, display device 102 may offload some of its processing tasks onto computing device 104.

To achieve this, a reliable data exchange mechanism is desirable between display device 102 and computing device 104. The physical medium for such data exchange between computing device 104 and display device 102 is facilitated by local network 118. As noted above, local network 118 can be any communication link between device 102 and device 104. For example, local network 118 may be an IP network implemented using a wired link conformant to an IEEE Ethernet standard such as 802.3i, 802.3u, or a wireless link conformant to Bluetooth or 802.11a.

Computing device 104 and display device 102 may be compliant to the Universal Plug and Play (UPnP) standard. The *UPnP AV Architecture, Version* 1.0, the contents of which are hereby incorporated by reference, describes an architectural framework that facilitates the flow of media content (e.g. movies, picture, songs) from a media server (e.g., PC, DVD player), to a media renderer (e.g., TV, display, speaker). In addition, data exchanges across local network 118 may be based on guidelines from the Digital Network Living Alliance (DLNA) which makes use of the UPnP standard.

UPnP compliant devices exchange messages over the hyper-text transfer protocol (HTTP) which runs on top either UDP or TCP protocol layers, over an IP protocol layer. The IP layer may of course be implemented over many types of physical and data link layers, such as Ethernet, Bluetooth and the like.

Conveniently, a network enabled display device, such as display device 102 with its network interface 246 interconnected to local network 118 may be easily adapted to conform to the UPnP standard without hardware modifications. As UPnP uses open, standard protocols such as TCP/IP, HTTP and XML, local network 118 may utilize any suitable wired or wireless medium such as a networking cable (e.g. Ethernet cable), radio frequency (RF), phone line, power line, or the like.

In the context of UPnP, data exchange involves a source device (media server), a sink device (media renderer) and a control point. The control point is independent of any particular content data format or transfer protocol, and coordinates content data transfer between a media server and a media renderer. The control point, media server and media render are all logical entities. In general, these entities may each be implemented in separate devices, or alternately, they may be combined and implemented in one or more physical devices as needed. Thus, for example, a control point and a media renderer may both be implemented on a single device such as display device 102, while the media server may be implemented on computing device 104. In other embodiments, the control point and the media server may be implemented on a single device. Various such arrangements are possible, as is suggested in the UPnP architecture document cited above.

UPnP devices contain services, which define state variables and actions. A control point in a UPnP network performs several tasks. These include: discovering other devices on the network, locating desired content, identifying supported protocols to match contents to protocols, configuring devices, selecting desired content and initiating content transfer, and finally cleaning up after a session is completed.

Each service in a given UPnP device publishes updates when its state variables change, by sending event messages. A control point may subscribe to receive this information via these event messages. Event messages contain the names state variables and the current value of those variables. To support multiple control points, all subscribers are sent all event messages and subscribers receive event messages for all state variables associated with events.

In one exemplary embodiment, local network 118 may be an Ethernet local area network interconnecting computing device 104 and display device 102. A control point may be formed as part of display device 102. A control point may also be formed on computing device 104. Computing device 104 and display device 102 thus communicate with each other via UPnP protocols for authentication, video placement, specifying media location (e.g., URLs), and the like.

In addition to a control point, each of display device 102 and computing device 104 may implement a media renderer and/or a media server which allows them to send and receive data at the same time. Accordingly a media server software component loaded computing device 104 may transmit video data received from network 106 (e.g., the Internet) and transcoded to display device 102.

Conversely, a media server component executing in display device 102 (not shown) could transmit video data received from computing device 104 back to a media renderer component in computing device 104 to be processed, thereby offloading some video processing steps.

Figure 5:
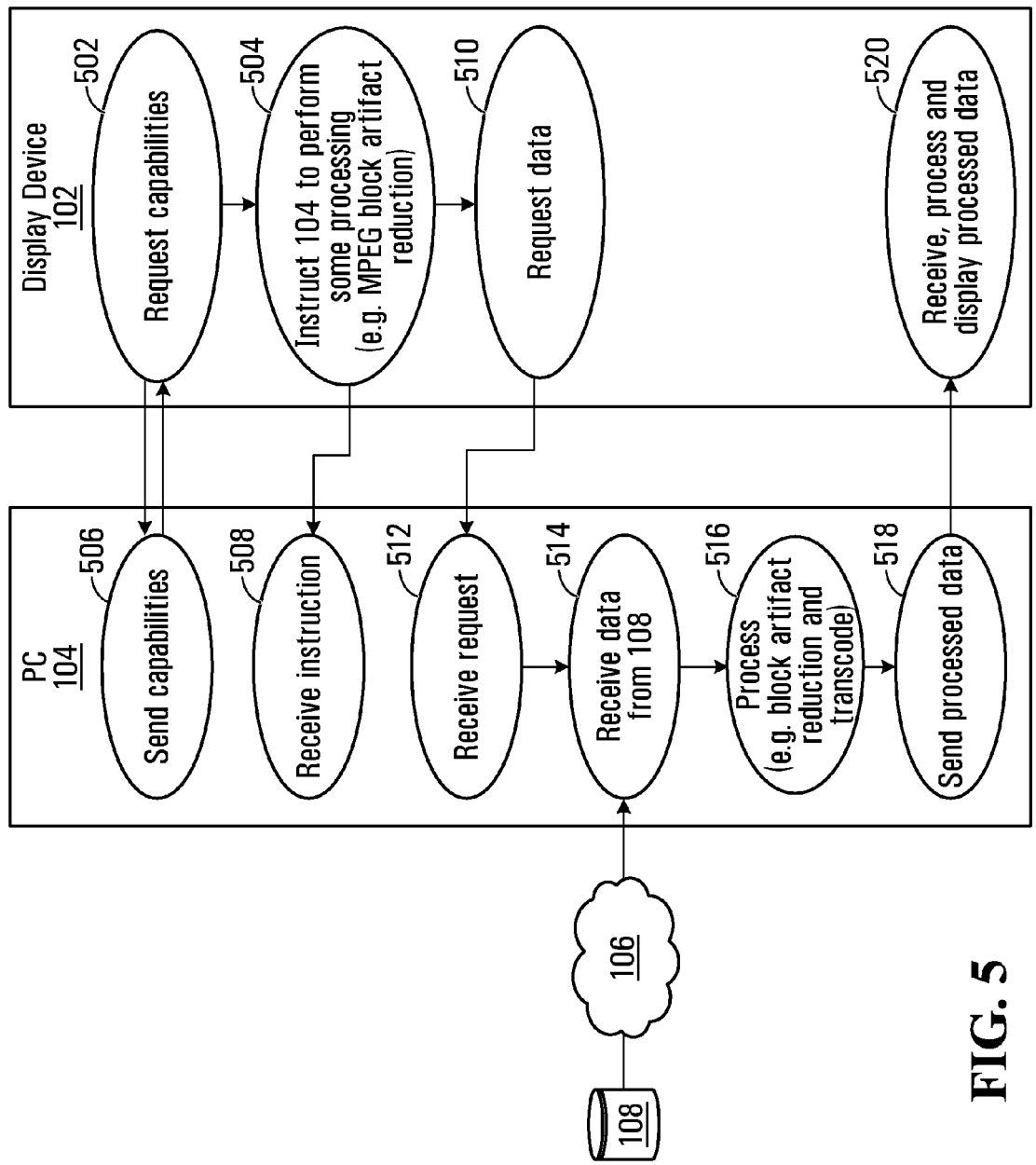
FIG. 5 is logical data transfer diagram depicting data transfers between the computing device and the display device of FIG. 1 in exemplary embodiments of the present invention.

FIG. 5 is a logical data transfer diagram depicting data transfers between media server and media renderer components executing in computing device 104 and display device 102, in one exemplary embodiment of the present invention.

As shown, device 104 and device 102 exchange their capabilities (502, 506). To do so, device 104 may specify a list of supported transfer protocols and data formats for retrieval by the display device 102. Subsequently display device 102 may select a particular transfer protocol and data format for exchange of data between device 102 and device 104.

Device 102 may further instruct device 104 to perform a specific audio or video processing task (504), such as, for example, MPEG block artifact reduction. This may happen, for instance, if the MPEG block artifact reduction is superior in device 104. The audio or video signal processing functions performed in device 104 would of course be complementary to any signal processing functions to be performed in display device 102 once the processed data is received in device 102.

Device 102 may request for audiovisual data (510). Device 104 may receive instructions (508) on which audio or video processing tasks to perform. Device 104 may also receive request for data (512). Device 104 may receive data (514) from video and audio server 108 and perform the processing task that has been negotiated earlier (i.e., MPEG block artifact reduction, and any transcoding needed to provide data in data format required).

Computing device 104 may accept data from network 106 (e.g. FLV encoded AV data from the Internet), decode and process the received data and encode the processed data in a format expected by device 102. Computing device 104 may then send the encoded data to device 102 (block 518). As noted above, the data may be sent as an MPEG transport stream (MPEG TS).

Then, device 104 may transmit the encoded data in MPEG format (518) to display device 102. Display device 102 may then perform some local processing to extract the audiovisual content. Local processing of the received video data which may be performed in display device 102 includes for example, decoding the received MPEG stream. Display device 102 may perform additional complementary processing and then display the processed data (block 520).

As noted, display device 102 may be UPnP compliant and may implement a control point. A control point in display device 102 determines a transfer protocol and a data format, to transfer the content from a media server a media renderer. Exemplary transfer protocols include IEEE-1394, HTTP GET, RTSP/RTP, etc., and exemplary data formats include MPEG2, MPEG4, MP3, WMA, JPEG, etc. The control point may alternately reside in device 104 or another device in communication with device 104 and device 102.

The processing performed in computing device 104 or display device 102 may be any of the common digital video signal processing tasks including decoding, filtering, noise reduction, MPEG block artifact reduction, scaling, de-interlacing, scan-rate conversion, color correction, contrast correction, gamma correction, sharpness enhancement, edge enhancement, frame rate conversion and the like. Other tasks related to audio may include tone processing, equalization, 3D virtualization or transcoding from one audio format to another.

In alternate embodiments, data exchange between computing device 104 and display device 102 need not be accomplished by way of an Ethernet network. Rather any networking medium and protocol may used. In addition, any interconnection established over power lines, Bluetooth, Wi-Fi, FireWire (IEEE 1394), infrared or the like may be used to setup the UPnP network.

Figure 6:
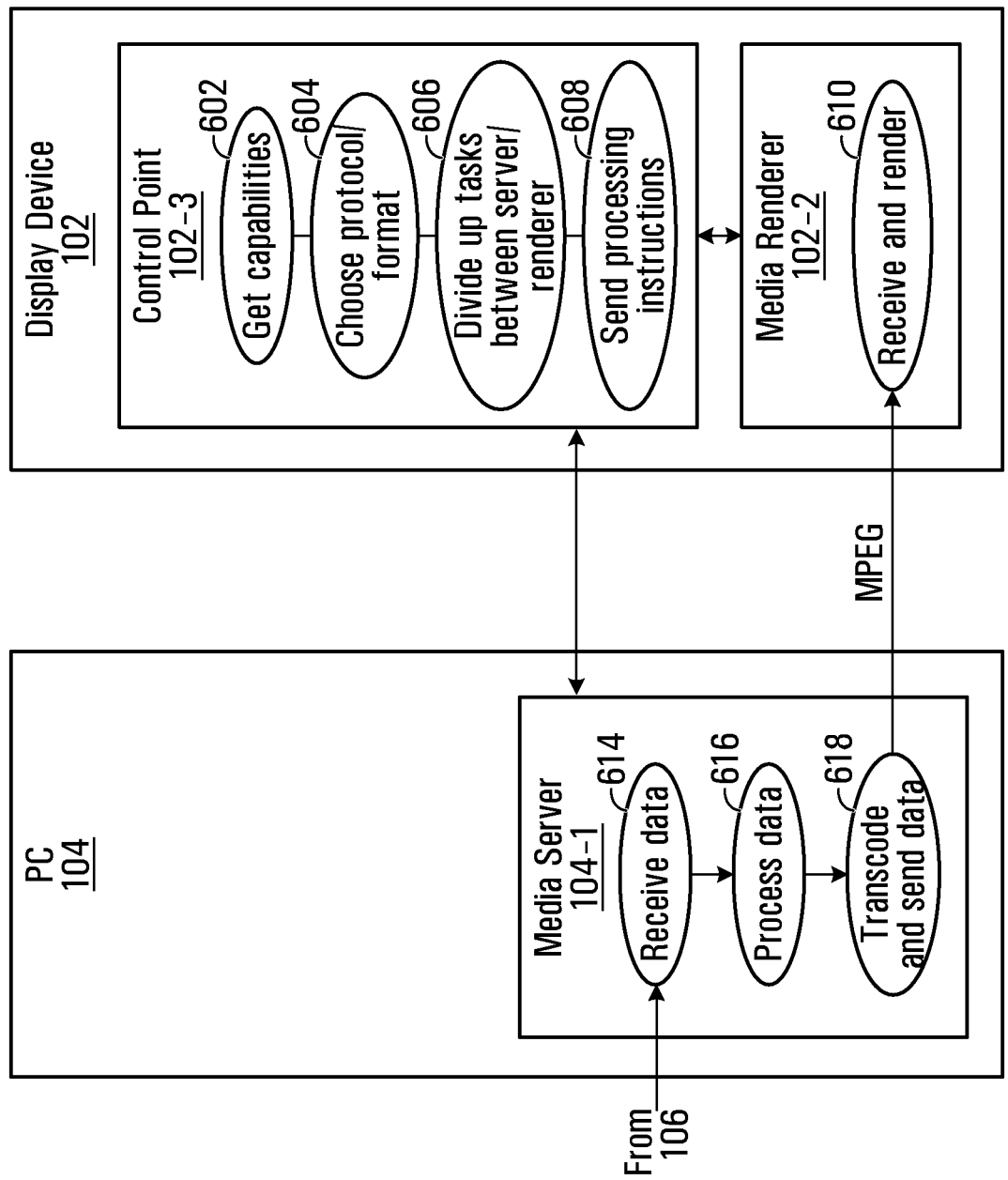
FIG. 6 is a schematic diagram depicting logical entities within the computing device and the display device of FIG. 1 in exemplary embodiments of the present invention.

FIG. 6 illustrates exemplary logical UPnP entities executing in display device 102 and computing device 104. Display device 102 and computing device 104 may be loaded with UPnP compliant software that contains media server components, control points and media renderer components all executing on the same physical device.

Accordingly, as shown, display device 102 may have UPnP media render 102-2 and UPnP control point 102-3. Similarly, computing device 104 may act as media server 104-1. Device 104 may optionally contain a media server and a control point while device 102 may also optionally contain a media render (not specifically illustrated). A media render is a logical sink device that accepts audiovisual data from a media server (which is logical source device).

After receiving data relating to the capabilities of media renderer 102-2 and media server 104-1 (602), control point 102-3 may set network transfer protocol and data format for the audiovisual data exchanged (604), divide up processing tasks between media renderer 102-2 and media server 104-1 (606) and send signal processing instructions to be performed accordingly (608).

Media server 104-1 may specify a list of supported transfer protocols and data formats in computing device 104 for retrieval by display device 102 consistent with requirements of UPnP compliance.

The data format and network transfer protocol selected by control point 102-3 would then of course supported by both the media server and render. Once selected, the data format transfer and protocol may be used to exchange data between media renderer 102-2 and media server 104-1 throughout a given session.

Subsequently, device 104 may receive (614) audiovisual input data from gateway device 112 for example, and set its media server 104-1 to have access to the received audiovisual content. Media server 104-1 is thus able to access received audio and video data, process the data (616) and transcode (into the selected data format) and transmit (618) the data to device 102 via network 118 using the agreed upon transfer protocol.

Media server 104-1 may support one or multiple transfer protocols and data formats for each content item or may be able to convert the format of a given content item into another format on the fly. For example, media server 104-1 may receive data in FLV format, process it, encode or transcode the processed data into MPEG transport stream format, and transmit it to media render 102-2 (i.e., display device 102).

Of course device 104 (i.e., media server 104-1) need not be a PC. Instead device 104 may be a VCR, CD/DVD player, a jukebox, a digital camera, camcorder, PC, set-top box, satellite receiver, digital terrestrial receiver, audio tape player, and the like.

As noted, control point 102-3 may determine a transfer protocol and a data format (604), used to transfer the audiovisual data content from media server 104-1 to media renderer 102-2. Exemplary transfer protocols include IEEE-1394, HTTP GET, RTSP/RTP, etc., and exemplary data format include MPEG2, MPEG4, MP3, WMA, JPEG, etc. Control point 102-3 may receive events such as an event indicating that data transfer from device 104 to device 102 is completed.

After determining or selecting a network transfer protocol (e.g. HTTP GET) and a data format (e.g. MPEG) for transferring data to and from computing device 104, display device 102 may instruct computing device 104 to perform at least one signal processing function (e.g. MPEG block artifact reduction) on the audiovisual input data to form externally processed data; to encode the externally processed data into the selected data format; and transmit it in the data format negotiated, using the selected network transfer protocol. Display device 102 may then receive the externally processed data (i.e., processed in device 104) and presenting it on display device 102.

The processing function (e.g. MPEG block artifact reduction) that display device 102 may instruct computing device 104 to perform may be complementary to other processing functions the display device 102 may itself perform (e.g., de-interlacing, color space conversion, contrast correction, gamma correction, sharpness enhancement and edge enhancement). That is, display device 102 offloads some processing functions so that it may perform complementary processing functions on the received stream.

For example, display device 102 may offload filtering to remove blocky artifacts that may be observed, by instructing device 104 to perform MPEG block artifact reduction prior to transcoding and sending audiovisual data as an MPEG stream. Accordingly display device 102 may use the UPnP controller (control point 102-3) to instruct the UPnP source (media server 104-1) to transmit audiovisual data that is already processed (e.g. MPEG block artifact reduction performed) to the UPnP sink (media render 104-2). In addition to transcoding which may be necessary to conform to the data format, at least one signal processing task may be offloaded to device 104. Finally, media render 104-2 may receive and render (610) the received processed data.

Upon receiving the externally processed data encoded as an MPEG stream, media renderer 102-2, may decode the received MPEG TS using decoder 224 to form pictures (fields or frames of data) to be displayed.

Media server 104-1 and media renderer 102-2 may send event notifications to control point 102-3 to inform the control point of a change in the state of media server 102-1 or media renderer 104-2 respectively.

Upon receiving audiovisual data, media renderer 102-2 may use processor 200 and/or GPU 240 to perform any additional image processing task such as filtering, noise reduction, frame rate conversion, or the like.

In alternate embodiments, a portion of the data received in device 102 may be sent back to device 104 (or another device on local network 118) for further processing, and then received back in device 102 for presentation. Accordingly another UPnP media server instance may be present in device 102 to transmit data for processing, and a corresponding instance of UPnP media render may be present in device 104 (or another device on network 118) to receive data, as well as a corresponding control point to coordinate the exchange of data. Yet other server, render and control point instances may also be present to remit externally processed data back to device 102. As UPnP media servers can have simultaneous connections to multiple media renders, media server 104-1 may optionally be used to send multiple streams to device 102.

Figure 7:
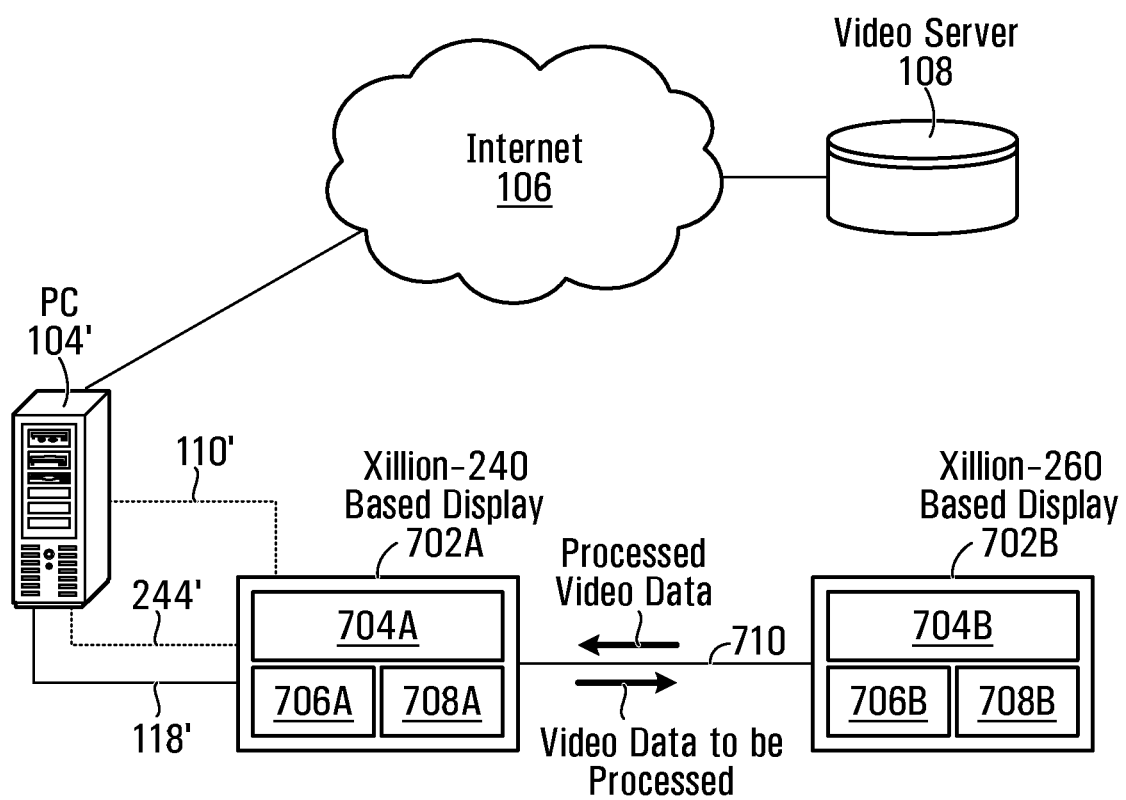
FIG. 7 is a schematic diagram of another exemplary arrangement of two display devices and a computing device, interconnected to cooperatively process audio and video data received from an audio and video server via a network.

In alternate embodiments, multiple devices may cooperate in processing the received video stream. FIG. 7 depicts a simplified block diagram of another exemplary embodiment of the present invention. The arrangement depicted in FIG. 7 is similar to the embodiment depicted in FIG. 1. Thus like components are labeled with similar labels with a prime symbol (') used to distinguish those in FIG. 7 from their corresponding components in FIG. 1. As shown, two display devices 702A, 702B (individually and collectively display devices 702) are interconnected to a personal computing device 104' using a suitable local network 118', a video link 110' or another optional link 244'. Computing device 104' is in communication with video server 408 via a data communications network 406 such as the Internet. Display devices 702A, 702B may be interconnected to each other by link 710.

Display devices 702A, 702B may be sophisticated digital displays (e.g., DTVs or digital HDTVs). Video link 110' may be substantially the same as video link 110 of FIG. 1. Display devices 702A, 702B may each include a processing circuit such as control circuits 704A, 704B, display screens 706A, 706B and speaker 704A, 704B respectively. Circuits 704A, 704B may be capable of decoding and processing video data, Circuits 704A, 704B may be formed as application specific integrated circuits (ASICs). Circuit 704A and circuit 704B may have different processing capabilities and internal memory. Specifically circuit 704B may be more powerful that circuit 704A. For example, circuit 704A may be a Xilleon-240™ digital video processor while circuit 704B may be a Xilleon-260™ digital video processor, both supplied by Advanced Micro Devices Inc. of Sunnyvale, Calif., U.S.A.

Each one of circuits 704A, 704B may have an MPEG decoder block, and an image processing block responsible for one or more of scan-rate conversion, interlacing, de-interlacing, noise reduction, scaling, color correction, contrast correction, gamma correction, sharpness enhancement, edge enhancement, frame rate conversion and the like.

In operation, the processing power of circuit 704A (or the size of its memory) may not be allow it to process video stream received into display 702A from device 104' in a timely fashion. Accordingly, in the embodiment depicted in FIG. 7, display device 702B may be used to assist display device 702A in performing at least part of the required video processing tasks. In other words, display device 702A may offload some of its processing tasks to display device 702B.

In particular, as circuit 704B may be more powerful than circuit 704A, overall performance of the arrangement in FIG. 7 may be improved if circuit 704A hands off some processing tasks such as filtering, noise reduction, de-interlacing or frame rate conversion to circuit 704B while performing other tasks (e.g. scaling) itself.

Link 710 may be an Ethernet link, which may be used for UPnP AV compliant communication between display devices 702A, 702B. The communication may be in-band (using standard UPnP control protocols) while the transfer of data may be out-of-band (using non-UPnP transfer protocols).

Specifically, the data and signal exchanges depicted in FIGS. 5-6 may take place between display device 702A and 702B with display device 702A and 702B playing roles that are analogous to display device 102 and computing device 104 respectively.

In alternate embodiments, video processing tasks may be distributed across all three devices depicted in FIG. 7 namely: computing device 104', display device 702A and display device 702B. In this case display device 702A offloads a first portion of its video processing tasks to computing device 104' while sending a second portion to display device 702B for processing. The overall efficiency of the arrangement would be improved by utilizing the otherwise idle processing power available in computing device 104' and display device 702B.

Specifically, display device 702A may receive audiovisual data and locally process at least some of the audiovisual data. It may then transmit a portion of the audiovisual to computing device 104' or display device 702B, which may accept the portion of data sent, process it, and output externally processed data (i.e., processed outside of device 702A). Display device 702A may then receive the externally processed video data and present it on its display screen.

As may be appreciated, the arrangement of FIG. 7 may be extended with up to N devices which share the video and audio processing tasks as needed. The UPnP architecture descried above is easily extensible for use with multiple devices.

Figure 8:
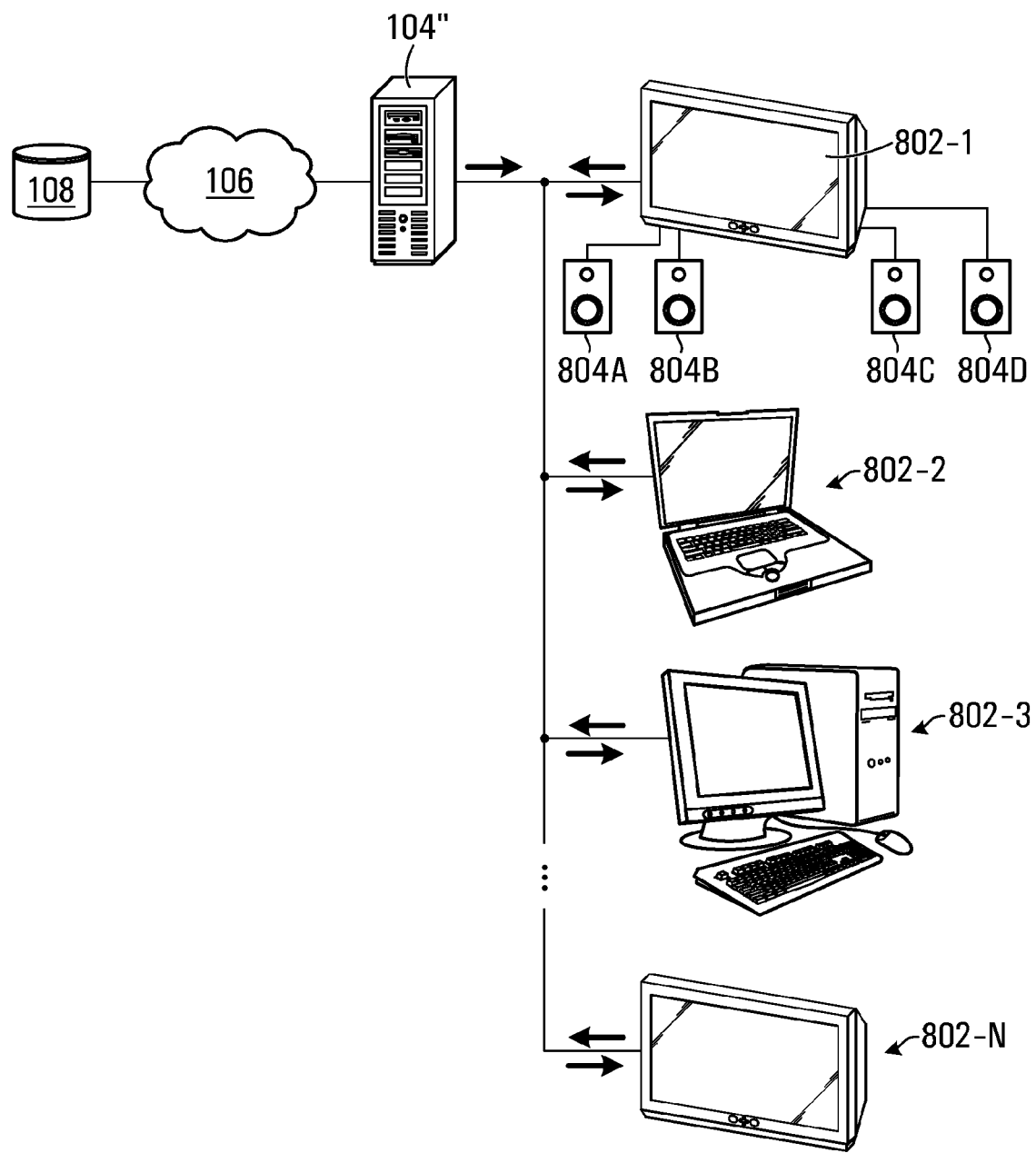
FIG. 8 is a schematic diagram of another exemplary embodiment in which the arrangement depicted in FIG. 7 is extended to include additional devices to cooperatively process audio and video data.

Accordingly, FIG. 8 depicts a schematic diagram of a computing device 104" and N networked devices 802-1, 802-2, 802-3, ..., 802-N, (individually and collectively devices 802) interconnected by way of an Ethernet network. Computing device 104" is in communication with audio and video and server 108 via data communications network 106 (e.g. the Internet). Device 802-1 may be interconnected to multiple speakers 804A, 804B, 804C, 804D (individually and collectively speakers 804). As shown, devices 802 may include personal computers, laptops, display devices and the like.

In operation, audiovisual content may be received by computing device 104" and transcoded and transferred to display device 802-1 using UPnP in manners similar to that described for the embodiment depicted in FIG. 7. Device 802-1 may then transmit portions of its received audiovisual contents to one or more of devices 802-2, 802-3 . . . 802-N for video processing. Each of devices 802-2, 802-3 . . . 802-N may carry out a particular video or audio processing task (e.g., scaling, block artifact reduction, noise reduction, sample rate conversion, equalization processing, etc.), effectively sharing the computational load that would otherwise fall on device 802-1 alone. For example, one or more of devices 802-2, 802-3 . . . 802-N may receive mono-audio from device 802-1 to virtualize and retransmit back separate audio channel streams; so as to simulate surround sound audio, using speakers 804 attached to device 802-1. Subsequently device 802-1 receives processed audio visual data from each of devices 802-2, 802-3 . . . 802-N and outputs the processed data on its screen and speakers 804.

Embodiments may include UPnP networks in which a single physical device may be used to implement a media renderer and a control point; or a media server and a control point; or a media server only, a media render only and a control point only; as needed. Many implementations of these logical instances are possible. In addition, network devices 802 need not all be PCs or displays, but any suitable UPnP compliant devices.

The skilled reader would readily appreciate that the use of UPnP is only exemplary in the embodiments described, and other proprietary protocols may be used to facilitate control and data transfer among the various devices involved in the shared processing of video prior to presentation by a display device.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of processing audiovisual input data using a computing device, for presentation on a display device interconnected to said computing device via a local network, said method comprising:
   i) receiving a request from said display device querying the signal processing capabilities of said computing device;
   ii) sending a response to said display device identifying the signal processing capabilities of said computing device;
   iii) receiving instructions from said display to use a selected one of network transfer protocols supported in said computing device and a selected one of data formats supported in said computing device; and to perform a specific first group of signal processing functions from among a set of signal processing functions to be performed on audiovisual data in said selected data format after decoding said data and prior to presentation, wherein said first group of signal processing functions have been determined by said display device by dividing said set of signal processing functions using said response, and are among said signal processing capabilities of said computing device, as communicated;
   iv) performing said first group of signal processing functions on said audiovisual input data to form externally processed data;
   v) encoding said externally processed data into said selected data format; and
   vi) transmitting said externally processed data in said selected data format to said display device over said local network using said selected network transfer protocol.

2. The method of claim 1, further comprising specifying a list of said transfer protocols and said data formats supported in said computing device for retrieval by said display device prior to said receiving said instructions.

3. The method of claim 1, wherein said first group of signal processing functions comprises at least one of filtering, noise reduction, block artifact reduction, interlacing and frame rate conversion.

4. The method of claim 1, wherein said local network is an internet protocol (IP) network and said display device and said computing device are compliant to the universal plug and play (UPnP) standard.

5. A method of processing and presenting audiovisual input data using a display device interconnected to a computing device via a local network, said method comprising:

at said display device:
i) sending a request from said display device to said computing device to query the signal processing capabilities of said computing device;
ii) receiving a response identifying said signal processing capabilities of said computing device;
iii) identifying a set of signal processing functions to be performed on audiovisual data received in a desired data format after decoding said data and prior to presenting said data;
iv) dividing said set of signal processing functions using said response into a first group of at least one function to be performed by said computing device and a second group of at least one function to be performed by said display device based on said response and said signal processing capabilities of said computing device;
v) instructing said computing device to:
   a) perform said first group of signal processing functions on said audiovisual input data to form externally processed data;
   b) encode said externally processed data into said selected data format; and
   c) transmit said externally processed data in said data format to said display device using a selected network transfer protocol over said local network;
vi) receiving said externally processed data in said data format in said display device;
vii) performing said second croup of signal processing functions complementary to said first signal processing function on said received externally processed data; and
viii) presenting said received externally processed data on said display device.

6. The method of claim 5, further comprising determining said network transfer protocol and said data format for transferring data from said computing device to said display device.

7. The method of claim 5, wherein said local network is an internet protocol (IP) network and said display device and said computing device are compliant to the universal plug and play (UPnP) standard.

8. The method of claim 6, wherein said second group of signal processing functions comprises at least one of de-interlacing, color correction, contrast correction, gamma correction, sharpness enhancement and edge enhancement, audio equalization, 3D virtualization, volume control, balance and tone control.

9. A method of processing audiovisual input data using a display device interconnected to a computing device via a local network, said method comprising:
at said display device:
i) receiving said audiovisual input data in said display device using a selected transfer protocol and a selected data format;
ii) sending a request from said display device to said computing device to query the signal processing capabilities of said computing device;
iii) receiving a response identifying said signal processing capabilities of said computing device;
iv) identifying a set of signal processing functions to be performed on audiovisual data received in said data format after decoding said data and prior to presenting said data;
v) dividing said set of signal processing functions using said response into a first group of at least one function to be performed by said computing device and a second group of at least one function to be performed by said display device based on said response and said signal processing capabilities of said computing device;
vi) instructing said computing device to: receive and perform said first croup of signal processing functions on a portion of said audiovisual input data to form externally processed data; and to encode and transmit said externally processed data to said display device in said data format;
vii) transmitting said portion to said computing device using said transfer protocol and said data format; and
viii) accepting and presenting said externally processed audiovisual data from said computing device.

10. The method of claim 9, further comprising determining said network transfer protocol and said data format by selecting from a list of network transfer formats and data formats supported in said computing device, prior to said receiving.

11. The method of claim 9, further comprising, performing said second croup of signal processing functions locally in said display device prior to said presenting.

12. The method according to claim 9, wherein said local network implements an internet protocol (IP) layer and wherein said display device and said computing device are compliant to the universal plug and play (UPnP) standard.

13. A display device comprising a control circuit in communication with a display screen and a network interface for interconnection to a computing device via a local network, said display device operable to:
i) send a request from said display device to said computing device to query the signal processing capabilities of said computing device;
ii) receive a response identifying said signal processing capabilities of said computing device;
iii) identify a set of signal processing functions to be performed on audiovisual data received in a selected data format after decoding said data and prior to presenting said audiovisual data;
iv) divide said set of signal processing functions using said response into a first group of at least one function to be performed by said computing device and a second group of at least one function to be performed by said display device based on said response and said signal processing capabilities of said computing device;
v) send instructions from said display device to said computing device to: perform said first group of signal processing functions on audiovisual input data to form externally processed data; encode said externally processed data into said data format; and transmit said externally processed data in said data format to said display device using a selected network transfer protocol over said local network;
vi) receive said externally processed data transmitted in said data format;
vii) perform said second croup of signal processing functions on said received externally processed data; and present said received externally processed data on said display screen.

14. The display device of claim 13, further operable to communicate with said computing device to determine said network transfer protocol and said data format for exchanging data prior to instructing said computing device.

15. The display device of claim 13, wherein said local network is conformant to one of IEEE 802.3i standard, IEEE 802.3u standard, FireWire, Bluetooth, Wi-Fi and IEEE 802.11a.

16. The display device of claim 13, further interconnected to a second device via said local network, said second device receiving another stream of audiovisual input data, said display device further operable to:
  i) instruct said second device to process said another stream using a third group of signal processing functions complementary to said second group of signal processing functions to output another set of externally processed data; and
  ii) receive and display said another set of externally processed data.

17. The display device of claim 16, wherein said display device exchanges data with said computing device and said second device, using a universal plug and play (UPnP) compliant protocol over said local network.

18. The display device of claim 16, wherein said audiovisual input data comprises mono-audio input and at least one of said first, second and third groups of signal processing functions comprises simulating surround sound audio from said mono-audio input.

19. A computing device comprising a processor in communication with memory and a network interface for interconnection to a display device via a local network, said computing device operable to:
  i) receive a request from said display device querying the signal processing capabilities of said computing device;
  ii) send a response to said display device identifying the signal processing capabilities of said computing device;
  iii) receive instructions from said display device to use a network transfer protocol and a data format supported in said computing device; and to perform a specific first group of signal processing functions from among a set of signal processing functions to be performed on audiovisual data in said data format after decoding said data and prior to presentation, wherein said first group of signal processing functions have been determined by said display device by dividing said set of signal processing functions using said response, are among said signal processing capabilities of said computing device, as communicated;
  iv) perform said first group of signal processing functions on audiovisual input data to form externally processed data;
  v) encode said externally processed data into said data format; and
  vi) transmit said externally processed data in said data format to said display device using said network transfer protocol over said local network.

20. The computing device of claim 19, wherein said audiovisual input data is received from said display device.

21. The computing device of claim 19, wherein said audiovisual input data is received from a video server in communication with said computing device via a second network.

22. The computing device of claim 19, wherein said first croup of processing functions comprises at least one of noise reduction, block artifact reduction, edge enhancement, interlacing, frame rate conversion and scaling; and said second processing function comprises at least one of de-interlacing, color correction, contrast correction, gamma correction, sharpness enhancement, scan-rate conversion and 3D virtualization.

* * * * *